United States Patent [19]

Hirschfeld

[11] Patent Number: 4,509,370
[45] Date of Patent: Apr. 9, 1985

[54] PRESSURE-SENSITIVE OPTRODE

[75] Inventor: Tomas B. Hirschfeld, Livermore, Calif.

[73] Assignee: Regents of the University of California, Berkeley, Calif.

[21] Appl. No.: 430,578

[22] Filed: Sep. 30, 1982

[51] Int. Cl.³ .................... G01B 11/00; G01L 7/06
[52] U.S. Cl. ............................ 73/705; 250/227; 250/231 P
[58] Field of Search .............. 73/705, DIG. 11, 301, 73/745, 188, 729, 863.23; 250/227, 231 P; 372/40, 41; 128/673, 634; 374/159

[56] References Cited

U.S. PATENT DOCUMENTS

| | | | |
|---|---|---|---|
| 3,122,922 | 3/1964 | Kramer | 73/745 X |
| 3,353,115 | 11/1967 | Maiman | 372/41 |
| 3,714,829 | 2/1973 | Gilbert | 73/705 |
| 3,872,401 | 3/1975 | Cooley | 372/41 X |
| 3,913,393 | 10/1975 | Facy | 73/188 X |
| 4,075,493 | 2/1978 | Wickersheim | 374/159 |
| 4,158,310 | 6/1979 | Ho | 73/705 |
| 4,186,751 | 2/1980 | Fleischmann | 73/729 X |
| 4,270,050 | 5/1981 | Brogardh | 250/231 R |
| 4,272,733 | 6/1981 | Walling et al. | 372/41 X |
| 4,321,831 | 3/1982 | Tomlinson et al. | 73/705 |
| 4,322,978 | 4/1982 | Fromm | 73/705 |
| 4,322,979 | 4/1982 | Fromm | 73/705 |
| 4,342,907 | 8/1982 | Macedo et al. | 250/227 |
| 4,358,960 | 11/1982 | Porter | 73/705 |
| 4,385,637 | 5/1983 | Akhavi | 73/863.23 X |
| 4,421,384 | 12/1983 | McMahon | 250/227 X |

OTHER PUBLICATIONS

H. W. Gandy et al., "Energy Transfer in Triply Activated Glasses," Applied Physics Letters, vol. 6, No. 3, Feb. 1, 1965, pp. 46–49.

Wickersheim et al., "Ratioing Fluoroptic Temperature Sensor for Induced Hyperthermia," Presented Jun. 22-26, 1980, Fort Collins, Col.

Primary Examiner—Donald O. Woodiel
Attorney, Agent, or Firm—Stephen C. Macevicz

[57] ABSTRACT

Apparatus and method for sensing changes in pressure and for generating optical signals related to changes in pressure. Light from a fiber optic is directed to a movable surface which is coated with a light-responsive material, and which moves relative to the end of the fiber optic in response to changes in pressure. The same fiber optic collects a portion of the reflected or emitted light from the movable surface. Changes in pressure are determined by measuring changes in the amount of light collected.

15 Claims, 5 Drawing Figures

PRESSURE-SENSITIVE OPTRODE

BACKGROUND OF THE INVENTION

1. Field of the Invention:

The United States Government has rights in this invention pursuant to Contract No. W-7405-ENG-48 between the U.S. Department of Energy and the University of California, for the operation of Lawrence Livermore National Laboratory.

The invention relates to pressure-sensing apparatus, and particularly to apparatus for remote pressure sensing in hostile or inaccessible environments.

Pressure monitoring is crucial in a variety of situations arising in medicine, industrial process control, and scientific research. The difficulty of pressure monitoring is exacerbated when the region to be monitored is inaccessible or involves hazardous components such as high pressures, high temperatures, corrosive materials, or high radiation levels.

In medicine, invasive measurement of arterial blood pressure is necessary in the management of critically ill patients or those undergoing complex surgical procedures. Two methods are currently available for direct blood pressure measurements. The first, and most widely used, involves insertion of a fluid-filled catheter into an artery so that the arterial lumen is hydraulically coupled to an external pressure sensing device. Highly accurate arterial pressure-pulse measurements are difficult, if not impossible, however, because the natural frequency of the hydraulic coupling coincides with frequencies of physiological interest. Moreover, the frequency response is variable, depending on the length of the catheter tubing and other unpredictable factors, such as the presence of small bubbles, leaks, or overly compliant plastic tubing used as connectors. These latter factors have impeded attempts to electronically compensate for the undesirable characteristics of the hydraulic coupling.

The other method of direct arterial blood pressure measurement involves the use of miniature solid state or strain-gauge transducers mounted on the tip of a catheter. Although catheter-tip manometers introduce little or no distortion into the pressure signal, a number of practical problems retrict their routine clinical use. The transducers are expensive, and their fragility limits the number of uses for a single catheter. They exhibit DC electrical drift, requiring the use of a fluid-filled lumen or separate catheter to obtain absolute values of arterial pressure. Also, there have been reported instances of mechanical failure of the catheter tip, introducing additional clinical hazards.

In the area of industrial process control, monitoring reactor-vessel pressure is critical for safe and automated operation of nuclear power plants. Pressurized water and boiling water reactors operate at pressures ranging from 1000-1500 psi and temperatures ranging from 250°-350° C. Such conditions, together with the corrosive effects of water and high radiation levels, limit the choice of sensors available for monitoring pressure. Mechanical pressure transducers, such as bellows and diaphragms, are frequently used. However, the transducers are typically external to the reactor vessel, and require that pressure signals be transmitted through fluid conduits. Elimination of such instrument piping is highly desirable where toxic or corrosive fluids are involved, or where even minor leaks lead to severe disruptions in plant operation. In addition, tubing interposed between the point of measurement and the transducers adversely affects the system's frequency response.

Strain-gauge pressure transducers are highly accurate and can be used in hostile environments. However, there are drawbacks to their use. If pressure measurements must be precise, and there are wide and sudden changes in ambient temperature, thermal protection is necessary. High-pressure spikes such as those caused by rapid opening or closing of valves can damage the transducers. Finally, signal transmission from a strain-gauge transducer to point of readout is by electrical wiring. While this eliminates the response time lag encountered whenever a fluid signal-transmission medium is used, electrical wiring is subject to corrosion, heat damage, and breakage.

Many of the above-mentioned difficulties with current pressure-sensing technology can be overcome by using remote, in situ mechanical transducers coupled to a detector by optical waveguides, or fiber optics. Fiber optics are durable, corrosion-resistant, heat-resistant, and are available in very small diameters, which makes them amenable for use with miniaturized transducers.

Brogardh, in U.S. Pat. No. 4,270,050, dated May 25, 1981, discloses a remote pressure-sensing device which employs a transducer connected to a detector by a fiber optic. Pressure is sensed by measuring stress-induced changes in the absorption spectrum of a material placed in the path of an illumination beam at the site of the transducer. The transducer includes the stress-sensitive material and a means for converting pressure into a mechanical stress directed to the stress-sensitive material.

A problem with materials that have stress-dependent absorption spectra is that the spectral changes are also temperature dependent. Thus, for reasonable accuracy over appreciable temperature ranges, temperature stabilization is required. Another problem involves the need for converting pressure to stress on the sensitive material. The primary transducer for carrying out this conversion can impair the system's response time, and can increase the difficulty of miniaturization.

Ho, in U.S. Pat. No. 4,158,310, dated June 19, 1979, discloses a fiber optical pressure sensor which requires a cable of fibers and a deformable diaphragm having a reflective surface. The cable is divided at one end into two bundles, one of which is irradiated by a light source, and the other which directs reflected light to a detector. The irradiated fibers are distributed randomly among the fibers of the undivided part of the cable, which in turn is directed to the reflective surface of the deformable diaphragm. The other side of the diaphragm is in contact with the pressurized medium. The curvature of the diaphragm increases in response to increases in pressure, so that less light is reflected onto the fibers leading to the detector. Thus, the intensity of light collected by the detector varies inversely with the ambient pressure.

The use of a fiber cable and diaphragm makes miniaturization difficult, if not impossible. Cables also substantially increase the cost of the sensor, especially in remote sensing applications.

The foregoing illustrates the limitations of the current technology. It is apparent that it would be advantageous to provide an altenative to available methods, particularly in regard to remote pressure sensing apparatus.

SUMMARY OF THE INVENTION

It is therefore an object of this invention to provide an apparatus for remote pressure sensing in hostile or inaccessible environments.

Another object of this invention is to provide a remote pressure-sensing apparatus which generates an optical signal related to the magnitude of the pressure sensed.

Another object of this invention is to provide a remote pressure-sensing apparatus which generates an optical signal related to the magnitude of the pressure sensed, and which transmits said optical signal to a detector by a fiber optic.

Yet another object of this invention is to provide a low-cost, low-maintenance remote pressure sensor compatible with a multi-position monitoring system utilizing optical sensors.

Still another object of this invention is to provide a remote pressure-sensing apparatus which is rugged, yet amenable to miniaturization.

Another object of this invention is to provide a remote pressure-sensing apparatus utilizing fiber optics which is stable over a wide range of temperatures, extending, on the high end, to temperatures encountered in routine and emergency operation of nuclear, geothermal, and conventional power plants.

Another object of this invention is to provide a remote pressure-sensing apparatus utilizing fiber optics for high fidelity, direct monitoring of human and animal blood pressure.

Still another object of this invention is to provide a new method of direct blood pressure measurement.

Another object of this invention is to provide a new method for remotely measuring pressure in a hostile environment, such as an environment where there are high temperatures, high pressures, or corrosive materials present.

A further object of this invention is to provide a new method for remotely and simultaneously measuring temperature and pressure using a fiber optic sensor.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

These and other objects are attained in accordance with the present invention, wherein there is provided a fiber optic and at least one associated light source for illuminating a light-responsive material, the light-responsive material being attached to a movable surface, which is adjacent to the illuminating end of the fiber optic and which moves in response to changes in ambient pressure. The amount of light delivered to the light-responsive material depends on its distance from the end of the fiber optic; thus, the optical response of the light-responsive material is related to the distance of the movable surface from the end of the fiber optic. A portion of the optical response is collected and transmitted back to a detector by the same fiber optic that transmits the illumination beam. Changes in optical response, as determined by light collected and transmitted, can be readily correlated to changes in ambient pressure.

In further accordance with the present invention, novel uses of fiber-optic-based pressure sensors are provided for direct blood pressure measurement and in situ pressure measurements of high pressure-high temperature boilers and reactor vessels.

Since the invention employs optical signals in a manner analogous to the use of electrical signals in electrodes, the sensor is referred to as an optrode, the descriptor "optrode" being contracted from "optical electrode."

The present invention is addressed to problems associated with remote pressure monitoring in hostile or inaccessible regions. It advantageously overcomes many of these problems by combining rugged, high quality fiber optics with simple in situ transducers for generating optical signals related to ambient pressure. For blood pressure measurements, the problem of poor frequency response is overcome by the in situ pressure transducer and by the availability of small-diameter, catheter-sized communications-type fiber optics. For hostile environments involving high temperatures, high pressures, corrosives, and the like, the problem of providing reliable and durable in situ pressure sensors is overcome by the availability of mechanical transducers fabricated from durable alloys, such as zirconium, stainless steel, nickel alloys, and the like; by the availability of strong, heat-resistant, corrosion-resistant fiber optics; and by the ability to combine these elements to form simple, yet effective pressure sensors, based on the principles taught by the present invention.

Furthermore, all particular embodiments of the invention are amenable for use with a multi-position sensing system which comprises many sensors, all of which feed signals to a single station for analysis. Such a configuration can reduce costs by obviating the need for separate analyzers for each sensor, and can increase reproducibility between sensors by having all signals analyzed by the same instrument.

BRIEF DESCRIPTION OF THE DRAWINGS

Further objects of the invention, together with additional features contributing thereto and advantages accruing therefrom will be apparent from the following description of a preferred embodiment of the invention which is shown in the accompanying drawings, which are incorporated in and form a part of the specification. In the drawings.

DETAILED DESCRIPTION OF THE INVENTION

Reference will now be made in detail to the present preferred embodiment of the invention, an example of which is illustrated in the accompanying drawings.

Figure 1:
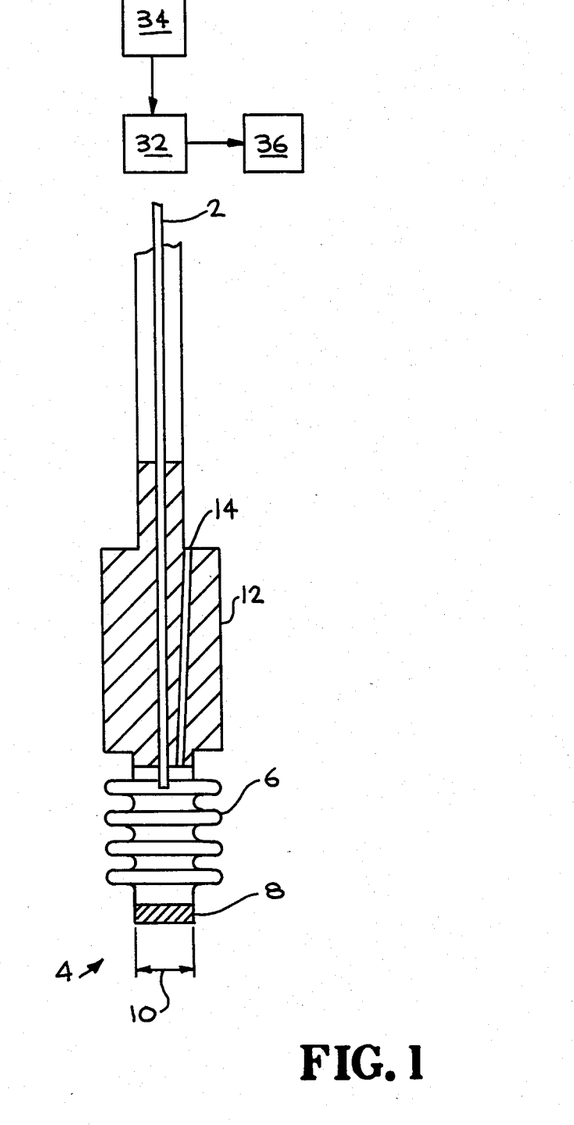
FIG. 1 is a cross-sectional view of a pressure-sensitive optrode incorporating a bellows as the resilient means.

The apparatus of the present invention comprises: at least one light source, a fiber optic, a resilient means having a movable surface with an attached light-responsive material, the resilient means allowing the movable surface to move relative to the light-emitting end of the fiber optic in response to changes in pressure, a beamsplitter, and a detection means. By way of example, FIG. 1 illustrates a preferred combination of the fiber optic 2, movable surface 4 of resilient means 6. These elements comprise the sensing end of the optrode. Before more specific reference is made to these and other elements, however, the theory of operation of the pressure-sensitive optrode will be described.

Figure 2:
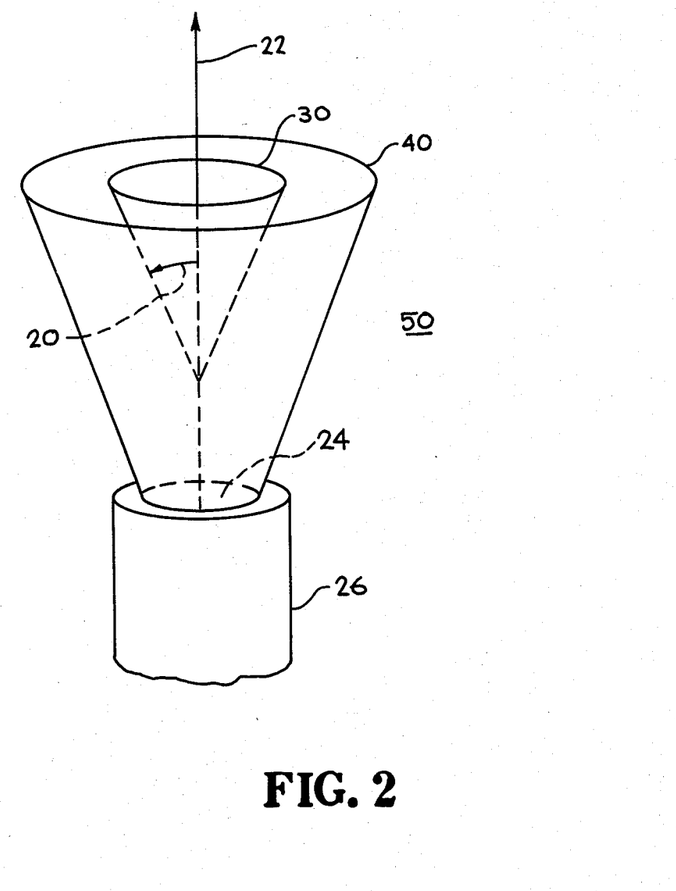
FIG. 2 illustrates the principle of operation of the pressure-sensitive optrode.

Operation of the pressure-sensitive optrode depends on a property of fiber optics. Light collected by a fiber optic is transmitted essentially loss-free along the length of the fiber optic only if it enters the fiber at an angle less than or equal to a characteristic angle 20 from normal 22 to face 24 of the fiber 26 (as indicated in FIG. 2). Because of this, the space adjacent to the face of the fiber can be divided into three regions according to whether all, some, or no light emanating from a point in the adjacent space and impinging on the face of the fiber core will be transmitted by the fiber. The regions are defined by two concentric cones, as shown in FIG. 2. All of the light emitted from a point in region 30 and impinging on the face of the fiber core will be transmitted, but only some of the light emitted from a point in region 40 and impinging on the face of the fiber core will be transmitted. Essentially no light will be transmitted from points in region 50, the region exterior to conical region 40. The amount of light collected by the fiber from a light-emitting surface perpendicular to the axis of the concentric cones is a well-defined, monotonically-varying function of the distance between the face of the fiber and the light-emitting surface. The crux of the pressure-sensitive optrode invention is taking advantage of this property by providing a surface substantially perpendicular to the axis of the fiber optic (and hence the axis of the cones) which emits or reflects light and which moves relative to the face of the fiber optic in response to changes in pressure. Hereinafter, the substantially perpendicular surface will be referred to as the movable surface 4, and the means of which it is a part and which allows it to move relative to the face of the fiber in response to changes in pressure will be referred to as the resilient means 6. Referring again to FIG. 1, the resilient means 6 is a bellows, and the movable surface 4 is simply the end of the bellows with a light-responsive material 8 attached to one side, the side upon which light from the fiber optic 2 impinges.

A large number of pressure-to-motion transducers can be used as resilient means in accordance with the invention. Much of the technology associated with the design of pressure-actuated switches is directly applicable to choosing a suitable resilient means for a particular embodiment of the invention. Accordingly, Lyons, *The Designer's Handbook of Pressure-Sensing Devices,* Van Nostrand Reinhold Company, 1980, is incorporated by reference.

Figure 4:
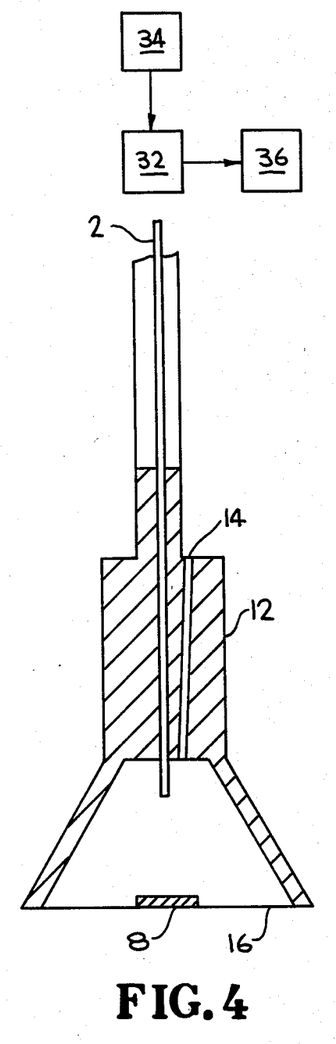
FIG. 4 illustrates an embodiment in which the resilient means comprises a diaphragm.
Figure 5:
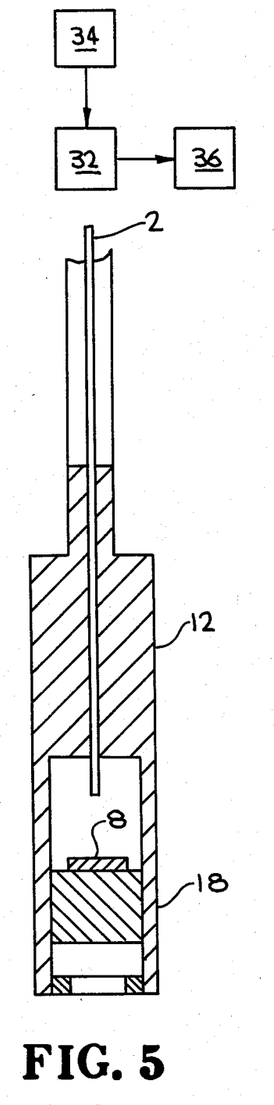
FIG. 5 illustrates an embodiment in which the resilient means comprises a piston.

The preferred resilient means 6 is a bellows, although other resilient means can be used, and may even be preferred in particular circumstances. Other resilient means include diaphragms, pistons, elastic membranes and the like. Embodiments of the invention that incorporate a diaphragm 16 and a piston 18 are shown in FIGS. 4 and 5, respectively.

The choice of a particular bellows is dictated by several factors, such as the operating temperature range, the nature of the pressurized fluid with which the bellows will be in contact, the operating pressure range, the expected frequency of pressure fluctuations, and so on. By way of example, for medical applications, size, frequency response, resistance to corrosive fluids, and durability are crucial design constraints. An optrode for direct blood pressure measurements must have a bellows with a resonant frequency well above the 20–30 hertz range, and it must have an outside diameter of no more than a millimeter, that is, it must be catheter-sized. Bellows meeting these design criteria can be readily fabricated by electroforming. Suitable materials for medical applications include gold, platinum, nickel, stainless steel and the like. For medical applications, such as direct blood pressure measurement, the bellows and other elements of the sensing end must be treated with a clot-inhibiting agent, such as albumin or the like.

For power plant applications, resistance to corrosive fluids, durability, and operability at high, and possibly varying, temperature are crucial design constraints. In the absence of crucial size constraints, commercially available stainless steel bellows can be employed. For use in a nuclear reactor vessel, zirconium bellows can also be fabricated.

In the preferred embodiment, a commercially available stainless steel bellows (Servometer Corp., Cedar Grove, N.J.) is employed. The diameter of the bellows, dimension 10 in FIG. 1, was ¼-inch.

In the preferred embodiment, the resilient means included a metal collar 12 for holding the fiber optic (2 in FIG. 1). The stainless steel bellows is silver-soldered to the collar. In the preferred embodiment, the collar includes a vent 14 so that bellows compression is determined solely by the ambient pressure and the effective spring constant of the bellows. In other embodiments, such as those for medical applications, the vent may not be preferred.

Another embodiment especially amenable to miniaturization employs an alternative resilient means which comprises a small plastic bubble attached to the second end of the fiber optic, that is, the distal end of the fiber optic relative to the detection means and the light source. This embodiment of the pressure-sensitive optrode can be formed in at least two ways. First, a mixture is formed which comprises a plastic dissolved in a volatile solvent. Second, a small quantity of the mixture is placed on the second end of the fiber optic. And third, an illumination beam is directed into the first end of the fiber optic at an elevated power level, so that the attached doplet of mixture begins to heat and a bubble forms. A second method of constructing this embodiment includes steps of dissolving a plastic in a vessel containing a volatile solvent, agitating the resulting solution until small bubbles form at the surface of the liquid, attaching one of the preformed bubbles to the second end of the fiber optic, and allowing the volatile solvent to evaporate, leaving the plastic bubble attached to the second end of the fiber optic. In both of the above-described cases, the movable surface is simply the section of the bubble surface opposite from the second end of the fiber optic. A fluorescent composition may be applied to the outside of the bubble. By way of example, the first of the above-described methods for constructing a miniature optrode has been implemented with collodion (J. T. Baker Chemical Co., Phillipsburg, Pa.), a nitrocellulose based plastic (U.S.P. specifications: pyroxylin 40 g, either 750 ml, alcohol 250 ml). A droplet approximately 0.05 milliliters is placed on the end of a Valtec PC-10 fiber optic (Valtec Optical Group, Waltham, Mass.). A beam of light from an argon laser, operating at 488 nm, at approximately 1 watt, and for approximately 30 seconds, was used to form a bubble. After cooling, the bubble was coated with a thin layer of fluorescein. The operating power of the illumination beam was approximately 100 milliwatts. Since the bubbles attached to the end of the fiber optic may be chosen so that their diameters are no larger than the diameter of the fiber optic, this embodiment is particularly well adapted to applications where miniature pressure sensors are required.

A critical feature of the movable surface is the light-responsive material attached to it. Light emitted or reflected from the light-responsive material forms the signal which must be detected by the detection means. Under particular conditions, some light-responsive materials may be more suitable than others. Reflective materials, diffuse, dichroic, or otherwise, are sufficient where optrode size is not a critical design constraint, or where the optrode is reasonably close to the detection means. In other cases, a fluorescent composition is preferred as the light-responsive material. By utilizing a fluorescent composition, an optical signal can be generated with a wavelength composition substantially different from that of the illuminating beam. This has the advantage of increasing the signal-to-noise ratio, because the optical signal is not obscured by light backscattered off the fiber material and back-reflected off the optics. Thus, where miniaturized or remote-sensing optrodes are employed, fluorescent compositions are the preferred light-responsive material. Where operability at high temperature is not a critical design constraint, a large number of commercially available fluorescent compositions can be used separately or in combination with one another.

More than one light source operating at different wavelengths may be preferred when fluorescent compositions are used that comprise more than one kind of fluorescent molecule. Each fluorescent molecule has a preferred range of excitation wavelengths. An illumination beam operating within the preferred range readily reduces fluorescent emission; an illumination beam operating outside the preferred range induces little or no fluorescence. Thus, where more than one fluorescent molecule is used, optimal performance may call for a plurality of light sources, each operating within a preferred wavelength range of the respective fluorescent molecules.

Fluorescent compositions are attached to the movable surface by mixing with a transparent glue or other binding agent, or by soaking a diffuse reflector, such as paper, silica gel and the like, with a solution containing the fluorescent compositions; then attaching the diffuse reflector to the movable surface. Examples of such commercially available fluorescent compositions include fluorescein, and the like.

Where operability at high temperatures is critical, various solid materials capable of lasing are available for use as light-responsive materials. By way of example, transition metal- or rare earth-doped glasses can be used, including, but not limited to uranyl-doped glass. Wafers of the material can be glued to the movable surface, or the material can be deposited on the surface in molten form. Crystalline laser materials, such as ruby or neodymium-doped crystals and the like, are also suitable light-responsive materials.

In particular, ruby affords a means of constructing a dual pressure-and-temperature-sensitive optrode within the purview of the subject invention. Ruby fluoresces at two closely spaced wavelengths, designated the $R_1$ and $R_2$ lines. The relative intensity of the two lines is a function of ambient temperature. Total signal intensity depends on both pressure and temperature. However, by measuring the relative intensity of the $R_1$ and $R_2$ emissions, not only can the temperature be determined, but also the temperature-dependent contribution to the total fluorescent intensity can be factored out to give an accurate pressure reading.

This embodiment requires a special detection means for analyzing the fluorescent signal generated by the optrode. First, the detection means has a stored table of ordered pairs relating the values of the $R_1/R_2$-intensity ratios to ruby temperatures. This table is referred to as the "stored temperature-ratio table." Second, the detection means has the capability of separately measuring the intensity of the $R_1$ emission line, collected and separated from the illumination beam, the intensity of the $R_2$ emission line, collected and separated from the illumination beam, and the intensity of the total fluorescence collected and separated from the illumination beam. This latter intensity is referred to as the "actual total fluorescence." By measuring the intensities of the $R_1$ and $R_2$ emission lines, the $R_1/R_2$-intensity ratio is formed, and the ruby temperature can be read from the stored temperature-ratio table. Third, the detection has a stored table of ordered pairs relating total ruby fluorescence to ruby temperature under the condition that the movable surface is at a predetermined distance from the second end of the fiber optic. This table is referred to as the "stored temperature-intensity table." A value of total ruby fluorescence can be read from the stored temperature-intensity table, once the ruby temperature is obtained from the stored temperature-ratio table. Fourth, the difference between the total ruby fluorescence obtained from the stored temperature-intensity table and the actual total fluorescence is computed. This difference is referred to as the computed difference. Fifth, the detection means has a table of ordered pairs that relates differences between actual total fluorescences and total ruby fluorescences from the stored temperature-intensity table to pressures. This table is referred to as the "stored pressure-intensity difference table." A value for pressure is read from the stored pressure-intensity difference table, once the computed difference is obtained. The special detection means requirements for this embodiment are readily carried out with the assistance of a small data acquisition computer, such as a DEC LSI-11 (Digital Equipment Corp., Waltham, Mass.).

Another advantage of ruby is that the range of preferential wavelengths for fluorescent excitation includes the output wavelength of helium-neon lasers. Therefore, these inexpensive and readily available lasers can be used as light sources for pressure optrodes employing ruby as their light-responsive material.

Figure 3:
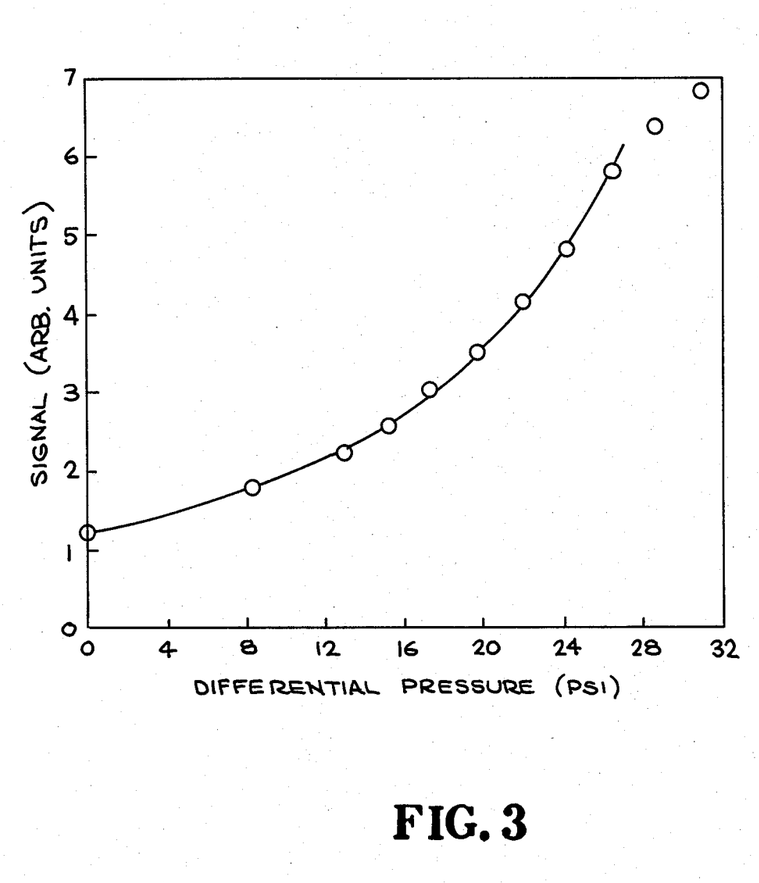
FIG. 3 illustrates relative signal intensity as a function of differential pressure for the preferred embodiment of the invention.

In the preferred embodiment, as exemplified in FIG. 1, a diffuse reflector made out of ordinary white filter paper soaked in fluorescein and a mirrored reflector are separately employed. FIG. 3 illustrates the relative signal intensity as a function of differential pressure for the diffuse reflector. The Figure shows that readily distinguishable signals are generated over a useful range of pressures after having been transmitted through approximately 200 meters of fiber optic.

A high-quality communications-type fiber optic is preferred for transmitting the illumination beam from the light source to the light-responsive material and for returning the generated optical signal to the detection means. A high-quality fiber reduces transmission losses and increases the range at which remote measurements may be taken. By way of example, in the preferred embodiment, as illustrated in FIG. 1, a 200-micron diameter Valtec PC-10 fiber optic (Valtec Optical Group, Waltham, Mass.) approximately 200 meters long is employed.

Operation of the optrode requires that the illumination beam, e.g., laser light, be focused onto an end of the fiber optic. Fluorescence or reflected light from the light-responsive material is then transmitted back along the same fiber. In order to quantitatively measure the intensity of the signal, the outgoing beam must be separated from the returning fluoresence or reflected light. A variety of beam-splitting means, 32 in FIGS. 1, 4 and 5, exist for accomplishing this objective. A beamsplitter that separates light according to its direction of travel can be employed, i.e., a one-way mirror. Alternatively, a dichroic mirror can accomplish separation by wavelength discrimination. Another alternative is a geometric beam-splitting means.

Light returning from the optrode leaves the fiber optic in a divergent beam. Since the illumination beam can be highly collimated for transmission through the fiber, separation of the outgoing and incoming beams is effected by providing a mirror with an aperture. The collimated illumination beam is focused through the aperture onto the fiber optic, while the mirrored surface around the aperture reflects the returning light to the detection means.

In the preferred embodiment, a geometric beamsplitting means is employed, although its use is not critical.

A laser is preferred as the light source, 34 in FIGS. 1, 4 and 5, for illuminating the light-responsive material, although other high-intensity sources can be employed. The type of laser employed may be dictated by the choice of light responsive material. For example, fluorescent compositions, as mentioned above, have preferential excitation wavelengths, and may require one or more lasers generating separate illumination beams at wavelengths best suited for inducing fluoresnce in the fluorescent molecules comprising the fluorescent composition.

In the preferred embodiment, partially illustrated in FIG. 1, the light source is an argon laser operating at 488 nm and 10 mW.

A great deal of variety is possible in the detection means, 36 in FIGS. 1, 4 and 5 employed for analyzing the optical signal separated from the illumination beam. The simplest and most effective means for signal detection is a photomultiplier tube in combination with appropriate optics and signal processing electronics.

In the preferred embodiment, a Spex double monochrometer is employed (Spex Corp., Metuchen, N.J.); however, a much less selective and less sensitive instrument would be just as suitable.

OTHER APPLICATIONS

The subject invention can be adapted to measuring changes in salt concentrations by sensing changes in osmotic pressure across a predetermined semi-permeable membrane. Such an adaptation requires that the sensing end of the pressure-sensitive optrode be enclosed by a hollow body with at least one port. The predetermined semi-permeable membrane covers the port so that only water or selected ions can enter the interior of the hollow body. By way of example, the hollow body could be a hollow cylinder surrounding the resilient means attached to the second end of the fiber optic by one end and open at the other end. In this example, the port is the open end of the cylinder.

The concentration of a known salt can be monitored by choosing a semi-permeable membrane impermeable to the known salt, but permeable to the surrounding solvent. A quantity of the known salt is placed inside the hollow body so that the concentration inside the hollow body is the same as the concentration outside the hollow body. Under these conditions, no osmotic pressure is generated inside the hollow body; therefore, no change occurs in the optical signal generated by the optrode. If the exterior salt concentration changes, however, osmotic pressure arises inside the hollow body, causing the resilient means to move closer to or farther away from the second end of the fiber optic, depending on whether the outside concentration change is an increase or a decrease. In either case, the optical signal generated by the optrode makes a corresponding change.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An apparatus for sensing changes in pressure and for generating optical signals related to said changes in pressure, the apparatus comprising:
    (a) a fiber optic through which light from at least one associated light source is transmitted from a first end of the fiber optic to a second end of the fiber optic;
    (b) resilient means operationally associated with the second end of the fiber optic, the resilient means having a movable surface which moves relative to the second end of the fiber optic along an axis of the fiber optic in response to changes in pressure and the movable surface having a fluorescent composition attached to one side such that light transmitted by the fiber optic impinges on the fluorescent composition, causing it to generate an optical signal;
    (c) a beam splitting means adjacent to the first end of the fiber optic for separating light from at least one associated light source from the optical signal generated by the fluorescent composition and transmitted by the fiber optic; and
    (d) detection means adjacent to the beam-splitting means for collecting and analyzing the optical signal generated by the fluorescent composition and transmitted by the fiber optic.

2. An apparatus as recited in claim 1, the apparatus further comprising at least one light source, wherein a substantial portion of the radiative power generated by the at least one light source occurs at wavelengths within the range of preferential wavelengths for exciting the fluorescent molecules of the fluorescent composition.

3. An apparatus as recited in claim 2, wherein said fluorescent composition is fluorescein.

4. An apparatus as recited in claim 2, wherein said fluorescent composition is a solid material capable of lasing.

5. An apparatus as recited in claim 4, wherein said solid material is a rare earth- or transition metal-doped glass.

6. An apparatus as recited in claim 5, wherein said rare earth- or transition metal-doped glass is uranyl-doped glass.

7. An apparatus as recited in claim 4, wherein said solid material is a crystal.

8. An apparatus as recited in claim 7, wherein said crystal is ruby.

9. An apparatus as recited in claim 1, wherein said resilient means is a piston, and wherein said movable surface is one side of the piston.

10. An apparatus as recited in claim 1, wherein said resilient means is a diaphragm, and wherein said movable surface is one side of the diaphragm.

11. An apparatus as recited in claim 1, wherein aid resilient means is an elastic membrane, and wherein said movable surface is one side of the elastic membrane.

12. An apparatus as recited in claim 11, wherein said elastic membrane is made of plastic.

13. An apparatus as recited in claim 12, wherein said plastic is collodion.

14. An apparatus as recited in claim 1, wherein said resilient means is a bellows, and wherein said movable surface is a first end of the bellows, and said second end of said fiber optic is adjacent to a second end of the bellows.

15. An apparatus as recited in claim 14, wherein said bellows is made of a material selected from the group consisting of stainless steel, zirconium, and electroformed nickel.

* * * * *